UNITED STATES PATENT OFFICE 2,674,600

DERIVATIVES OF 3,5-DIOXO-PYRAZOLIDINE

Franz Haefliger, Basel, Switzerland, assignor to J. R. Geigy, A. G., Basel, Switzerland, a Swiss firm No Drawing. Application October 25, 1951, Serial No. 253,228

Claims priority, application Switzerland November 6, 1950

2 Claims. (Cl. 260—310)

The present invention is concerned with a new derivative of 3,5-dioxo-pyrazolidine as well as with its salts with inorganic and organic bases. The new compound corresponds to the formula:

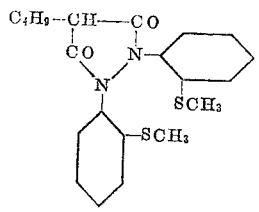

(I)

or to its tautomeric form.

In principle, the new compound is produced by condensation of suitable malonic acid derivatives with 1,2-di-(o-methyl mercapto phenyl)-hydrazine.

Thus, a reactive derivative of n-butyl malonic acid having the formula:

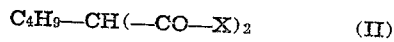

wherein X is a radical which can split off from the carboxylic acid derivative such as, e. g., halogen (acid halide), an alkoxy group (ester) or the like, can be reacted with a 1,2-diaryl hydrazine of the formula:

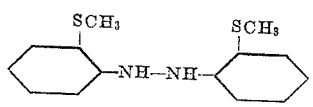

(III)

The reaction is suitably carried out in the presence of a condensing agent or an acid binding medium, as described below.

A preferred method of manufacture consists in heating a dialkyl ester, above all the diethyl ester, of the n-butyl malonic acid, with the diaryl hydrazine according to Formula III in the presence of a metal alcoholate, e. g., sodium ethylate or potassium tert. butylate. This brings about ring-closure with the splitting off of two molecules of the alcohol, which it is convenient to distil off, at temperatures between 100 and 200° C.

As condensing agents there come into consideration such compounds as are suitable for the replacement of a replaceable hydrogen atom by a metal atom, such as alkali metals and active alkali compounds.

The new compound can be used as a therapeutic and has an analgetic and antipyretic action. It also has an antiphlogistic effect.

It can also form salts with basic compounds. Alkali metal salts are readily soluble in water while the solubility of the alkaline earth metal salts is less and decreases with increasing atomic weight of the metal. The heavy metal salts are only slightly soluble in water but salts with organic bases such as ethylene diamine, triethanolamine, diethylamine, trimethylamine, possess a high degree of solubility. Such aqueous solutions can be used as solubility promoters for medicaments such as, e. g. 1-phenyl-2.3-dimethyl-4-dimethylamino-pyrazolone, which are difficultly soluble in water.

To prepare the soluble salts, the free pyrazolidine of Formula I is treated with an equimolecular quantity of a base containing the desired cation, e. g. with aqueous caustic soda, ethylene diamine, potassium hydroxide lye or sodium carbonate solution or with alcoholic caustic soda. It is best to employ stirring or shaking during the reaction. If an aqueous lye is used, then an excess of the pyrazolidine may be present, which, after the solution is neutral to phenolphthalein, can be removed by filtration.

The salt can be obtained in solid form when desired either by evaporation of the filtered solution or by adding a solvent in which the salt is insoluble, for example, by the addition of ether to an alcoholic solution of the sodium salt.

However, it is also possible to obtain the corresponding salt directly when using alkaline condensing agents, such as for example, sodium ethylate.

The alkali salts are obtained in the form of colourless powders, most of which are of considerable stability in the air. They are readily soluble in water and alcohol. Their solutions do not turn phenolphthalein red.

The difficultly soluble salts can be also prepared by double decomposition of an alkali or ammonium salt of the pyrazolidine of Formula I with a soluble alkaline earth or heavy metal salt, e. g. calcium chloride or silver nitrate. When working with a sufficiently concentrated solution the salts of the pyrazolidine of Formula I are obtained directly as precipitates. Alternatively they can be isolated by suitably concentrating or cooling the solution.

The following example serves to illustrate the invention. Parts are given as parts by weight and temperatures are in degrees centigrade.

Example 4.6 parts of sodium are dissolved in 100 parts of abs. alcohol. 40 parts of n-butyl malonic acid diethyl ester and 50 parts of o.o'-di-(methyl mercapto)-hydrazobenzene are added to this ethylate solution and the alcohol is distilled off. The whole is then heated at 160–170° for 12 hours. After cooling, the reaction mixture is dissolved in water, shaken out with carbon tetrachloride and the aqueous solution is treated with activated charcoal. On acidification of the clear filtered solution, 1.2-di-(o-methyl mercapto phenyl)-3.5-dioxo-4-n-butyl-pyrazolidine precipitates. On recrystallisation from methanol it melts at 124–125°.

What I claim is:

1. A member selected from the group consisting of 1.2-di-(o-methyl mercapto phenyl)-3.5-dioxo-4-n-butyl-pyrazolidine and salts thereof with bases.

2. 1.2-di-(o-methyl mercapto phenyl)-3.5-dioxo-4-n-butyl-pyrazolidine.

References Cited in the file of this patent

UNITED STATES PATENTS

| Number | Name | Date |
|---|---|---|
| 2,427,911 | Kendall et al | Sept. 23, 1947 |
| 2,562,830 | Stenzl | July 31, 1951 |

FOREIGN PATENTS

| Number | Country | Date |
|---|---|---|
| 267,222 | Switzerland | Mar. 15, 1950 |
| 269,986 | Switzerland | July 31, 1950 |
| 269,987 | Switzerland | July 31, 1950 |